United States Patent [19]
Warner

[11] Patent Number: 5,621,938
[45] Date of Patent: Apr. 22, 1997

[54] EDGE-OF-DOCK LEVELER AND METHOD OF MAKING

[75] Inventor: Robert J. Warner, Mukwonago, Wis.

[73] Assignee: Kelley Company, Inc., Milwaukee, Wis.

[21] Appl. No.: 525,474

[22] Filed: Sep. 8, 1995

Related U.S. Application Data

[63] Continuation of Ser. No. 131,990, Oct. 4, 1993, Pat. No. 5,450,643.

[51] Int. Cl.$^6$ ..................................................... E01D 1/00
[52] U.S. Cl. .......................... 14/69.5; 14/71.3; 14/71.7; 254/93 HP
[58] Field of Search ................................ 14/71.1, 71.3, 14/71.5, 71.7, 69.5; 254/1, 89 H, 89 R, 93 HP

[56] References Cited

U.S. PATENT DOCUMENTS

| | | | |
|---|---|---|---|
| 2,495,092 | 1/1950 | Cox et al. | 92/92 |
| 2,804,118 | 8/1957 | Bayerkohler | 72/392 |
| 3,211,425 | 10/1965 | Greulich et al. | 254/2 R |
| 3,521,861 | 7/1970 | Freudenthal et al. | 254/93 L |
| 3,628,487 | 12/1971 | Bennett | 114/287 |
| 3,659,899 | 5/1972 | Phillips et al. | 298/22 R |
| 3,685,077 | 8/1972 | Wiener et al. | 14/71.3 |
| 3,711,157 | 1/1973 | Smock | 298/8 R |
| 3,799,504 | 3/1974 | Vaughen | 254/93 HP |
| 3,977,349 | 8/1976 | Hummel | 114/287 |
| 4,572,579 | 2/1986 | Saito | 298/1 A |
| 4,665,579 | 5/1987 | Bennett et al. | 14/71.1 |
| 4,688,760 | 8/1987 | Garman et al. | 254/93 |
| 4,922,568 | 5/1990 | Hageman | 14/71.3 |
| 5,042,103 | 8/1991 | Megens | 14/71.7 |
| 5,178,367 | 1/1993 | Vaughen | 254/93 HP |
| 5,232,202 | 8/1993 | Watson | 254/1 |
| 5,274,867 | 1/1994 | Hageman | 14/71.7 |

FOREIGN PATENT DOCUMENTS 835142  5/1960  United Kingdom.

Primary Examiner—Henry A. Bennett
Assistant Examiner—Pamela A. O'Connor
Attorney, Agent, or Firm—Michael, Best & Friedrich

[57] ABSTRACT

An edge-of-dock leveler incorporating an inflatable lift bag. The leveler includes a frame mounted on the front face of the dock and the rear edge of a deck plate is hinged to the frame, while a lip is hinged to the forward edge of the deck plate. In the storage position, the deck plate is generally horizontal while the lip hangs downwardly in a pendant position. The frame includes a fixed pressure member and a movable pressure member is hinged to an edge of the fixed pressure member. A link interconnects the movable pressure member with the deck plate. An inflatable, flexible bag is located between the pressure members and by inflating the bag, the deck plate is pivoted from the horizontal position to the substantially vertical position. By deflating the bag, the deck plate will descend by gravity and the forward edge of the lip will move in a generally curved path into engagement with the bed of a truck parked in front of the loading dock.

8 Claims, 2 Drawing Sheets

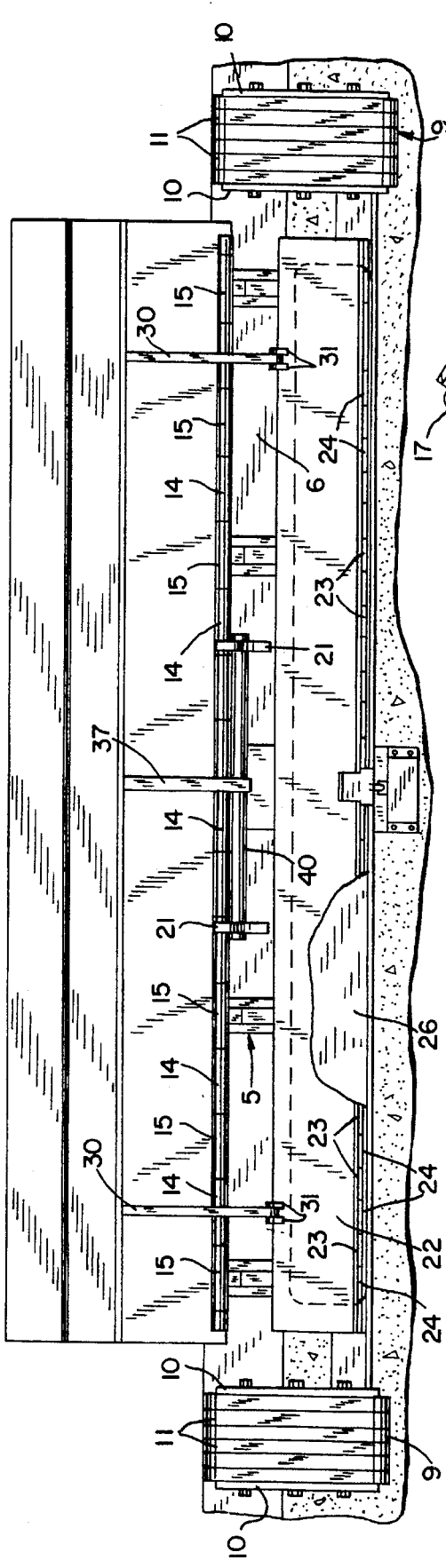
FIG. 4
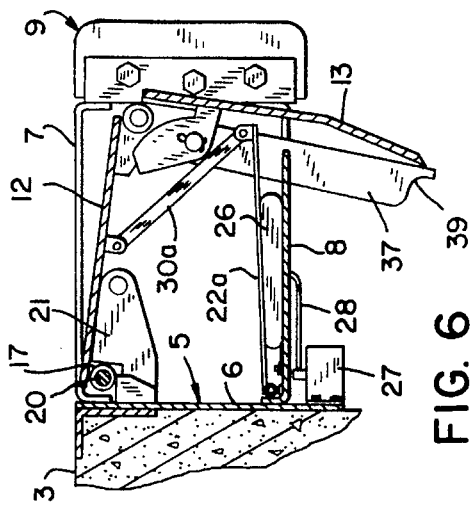
FIG. 6
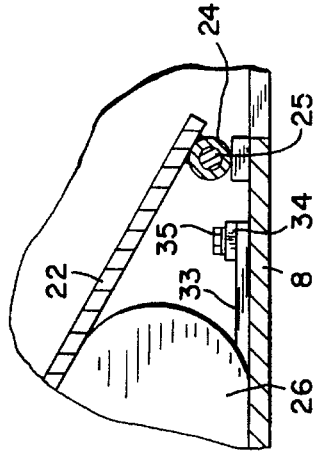
FIG. 7
FIG. 5

EDGE-OF-DOCK LEVELER AND METHOD OF MAKING

This is a continuation of application Ser. No. 08/131,990, filed Oct. 4, 1993, entitled "EDGE-OF-DOCK LEVELER", now U. S. Pat. No. 5,450,643.

BACKGROUND OF THE INVENTION

Dock levelers are mounted on a loading dock and are adapted to span the gap between the loading dock and the bed of a carrier or truck parked in front of the dock so that material handling equipment, such as a lift truck, can move conveniently between the dock and the truck bed.

One common form of dock leveler is mounted in a pit or recess formed in the dock surface and includes a ramp or deck plate which is stored in a generally horizontal position flush with the upper surface of the dock and is movable to an upwardly inclined position. A lip is hinged to the forward edge of the ramp and can be pivoted between a downwardly hanging pendant position, and an extended position where the lip forms an extension to the ramp.

Another form of dock leveler is a type known as an edge-of-dock leveler which is mounted to the front surface of the dock and thus does not require a preformed pit in the dock and can be utilized with existing docks. The conventional edge-of dock leveler includes a deck plate which is hinged to the frame of the leveler and a lip is pivotally connected to the forward edge of the deck plate. In the storage position, the deck plate is generally horizontal and the lip hangs downwardly in the pendant position. To move the leveler to an operating position, the deck plate is pivoted upwardly to a generally vertical position thus elevating the lip to a position above dock level, and the deck plate and lip are then moved forwardly to enable the lip to engage the bed of the truck.

In the past, the typical edge-of-dock leveler has been operated manually. For example, an operator, standing on the dock and using a long hook-like implement, engages the deck plate and pivots the deck plate upwardly to the vertical position. The lip is then engaged by the implement and pivoted to the extended vertical position, and the leveler is then lowered to bring the extended lip into engagement with the truck bed. Because of the weight of the deck plate and the lip, it is very difficult to manually pivot the deck plate and the lip upwardly to the vertical position, To facilitate the lifting of the deck plate and the lip to the vertical position, it has been proposed to incorporate a counterbalancing mechanism. Not only is a counterbalancing mechanism expensive, adding to the cost of the unit, but the counterbalancing mechanism exerts an upward force on the deck plate and may tend to prevent firm contact between the lip and the truck bed, particularly when a fork lift truck, or other load, jars the deck plate, as the fork lift truck moves across the deck plate.

It has also been proposed to utilize a hydraulic system to move the deck plate and lip of the edge of dock leveler to the upper or vertical position. In a typical hydraulic system, a hydraulic cylinder unit is interconnected between the frame of the leveler and the deck plate. However, the use of a hydraulic system substantially increases the overall cost of the leveler.

SUMMARY OF THE INVENTION

The invention is directed to an edge-of-dock leveler incorporating an inflatable bag to move the deck plate from the horizontal to the vertical position. The leveler includes a frame which is attached to the front face of the loading dock, and the rear edge of a deck plate is pivoted to the frame. The deck plate is movable from a generally horizontal storage position, to an upper generally vertical position. Hinged to the forward edge of the deck plate is a lip and in the storage position, with the deck plate horizontal, the lip hangs downwardly in a pendant position.

In accordance with the invention, the frame includes a fixed pressure member which preferably extends substantially the entire side-to-side width of the leveler, and a movable pressure member is hinged to an edge of the fixed pressure member. A linkage pivotally interconnects the movable pressure member with the deck plate.

Located between the pressure members is a flexible inflatable bag and by inflating the bag through use of low pressure air or other gas, the movable pressure member will be pivoted upwardly thereby pivoting the deck plate from the horizontal storage position to a substantially vertical position.

The deck plate and lip are held in the elevated vertical position by a locking bar which engages an abutment on the leveler frame. In this upper position, the lip is located at an acute angle with respect to the deck plate and the lower edge of the lip is located above dock level.

By discontinuing operation of the fan or blower, the bag will deflate and the deck plate will descend by gravity toward the horizontal position. The locking bar enables the outer edge of the lip to move in a generally curved path, thus ensuring that the lip will clear the bed of the carrier and move downwardly into engagement with the carrier bed.

With the construction of the invention, the deck plate and lip can be pivoted from the storage position to the upper vertical position without manual effort through inflation of the flexible bag.

The invention provides an inexpensive edge-of-dock leveler which has all the advantages of a hydraulic operated edge-of-dock leveler, but which has a substantially reduced cost.

In the operative position, with the lip engaged with the bed of the truck or carrier, the entire weight of the deck plate and lip is on the truck bed, so that there is no tendency for the leveler to jack-knife as material handling equipment travels over the leveler from the loading dock to the truck bed.

As a further advantage, when the bag is deflated, the air from the bag passes back through the fan or blower, thus providing a controlled descent for the deck plate and lip to prevent the lip from banging down onto the carrier bed.

Other objects and advantages will appear in the course of the following description.

DESCRIPTION OF THE DRAWINGS

The drawings illustrate the best mode presently contemplated of carrying out the invention.

In the drawings:

FIG. 4 is a front elevation of the leveler, with the deck plate and lip in the elevated position;

FIG. 5 is a fragmentary enlarged vertical section showing the attachment of the bag tether to the fixed pressure plate;

FIG. 6 is a vertical section of the leveler showing a modified form of the invention and illustrating the deck plate in the horizontal cross traffic position; and FIG. 7 is a view similar to FIG. 6 showing the plate and lip in an elevated position.

DESCRIPTION OF THE ILLUSTRATED EMBODIMENT

Figure 1:
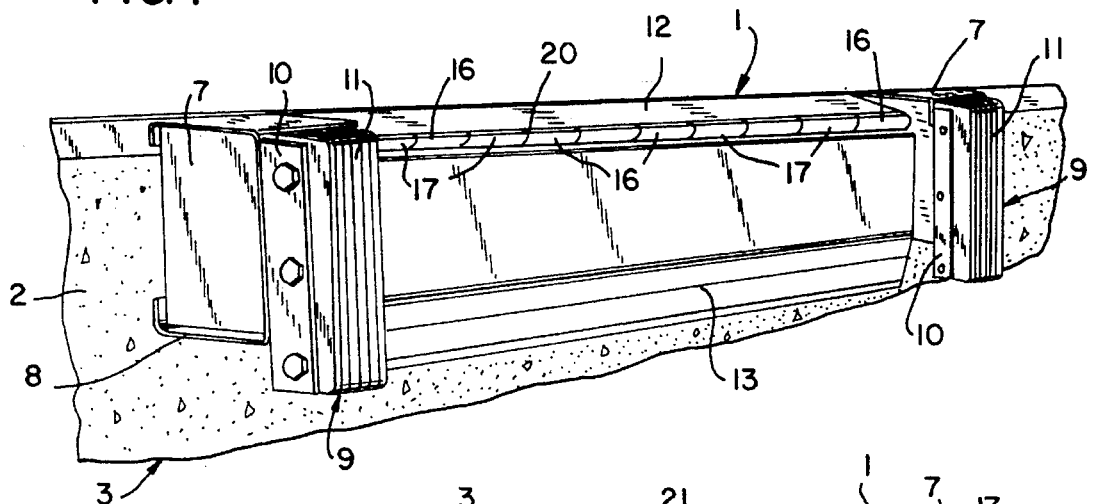
FIG. 1 is a perspective view of the edge-of-dock leveler of the invention with the deck plate in the horizontal cross-traffic position.

The drawings illustrate an edge-of-dock leveler 1 mounted on the front face 2 of a loading dock 3. The leveler 1 is adapted to span the gap between the loading dock and the bed 4 of a truck or other carrier, which is parked in front of the loading dock.

Leveler 1 includes a frame or supporting structure 5 composed of a vertical plate 6 that is mounted to the front face 2 of dock 3, and box-like frame members 7 are connected to opposite ends of plate 6. In addition, a horizontal plate 8 is coextensive with plate 6 and is connected to the lower ends of frame members 7.

Bumpers 9 are mounted on the outer extremities of frame members 7 and are positioned to be engaged by the rear end of the truck 4, as the truck backs toward the loading dock, to prevent damage to the leveler. Each bumper 9 includes a pair of spaced vertical angles 10, which are mounted on either side of a series of resilient strips 11.

Leveler 1 includes a deck plate 12 and a lip 13. To pivot the rear edge of the deck plate 12 to frame 5, hinge tubes 14 and 15 are secured to the deck plate 12 and to plate 6. Hinge tubes 14 and 15 are in staggered aligned relation and are connected by a suitable hinge pin, thus enabling the deck plate 12 to be pivoted relative to the frame 5.

To pivotally connect lip 13 to the forward edge of the deck plate 12, a series of hinge tubes 16 are secured to the deck plate and are mounted in staggered alignment with hinge tubes 17 which are secured to strip 19 that, in turn, is welded to the rear end of lip 13. Hinge pin 20 interconnects the hinge tubes 16 and 17 to permit the lip to pivot relative to the deck plate. As the lip 13 pivots upwardly relative to the deck plate 12, the rear edge of the lip will engage the forward edge of the deck plate to limit the pivotal movement of the lip, so that the lip will not move beyond a position which is generally flush with the deck plate. Deck plate 12 is maintained in the generally horizontal cross-traffic position by engagement with a series of lugs 21 which are welded to plate 6 and project forwardly from the plate, as seen in FIG. 2.

Figure 2:
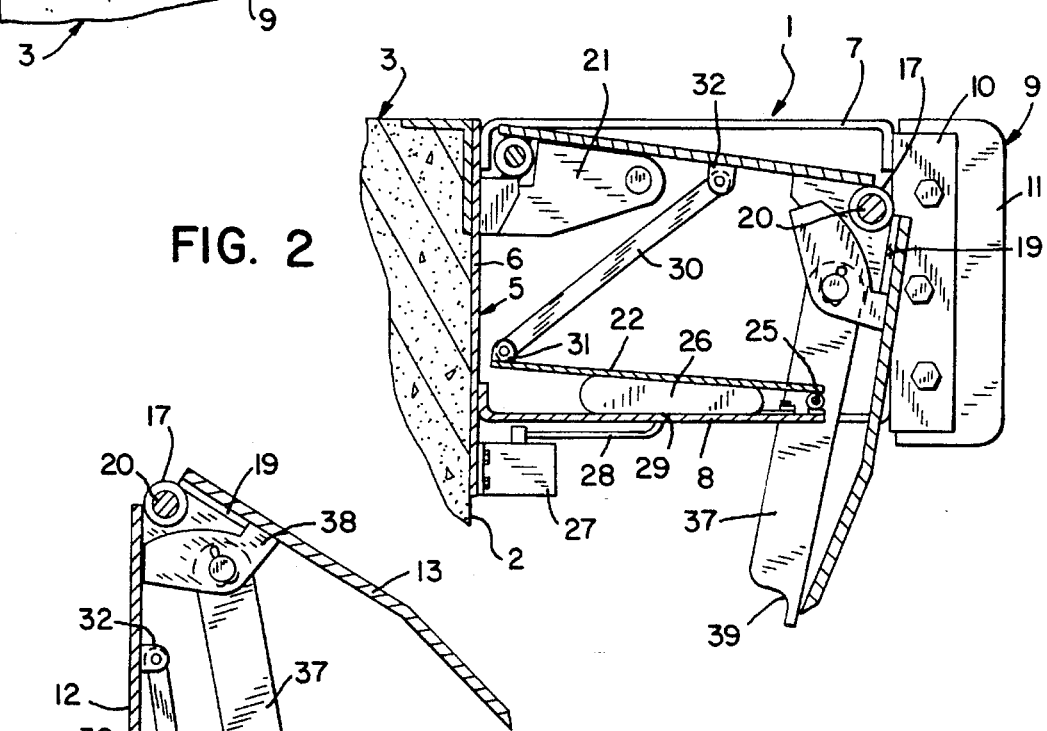
FIG. 2 is a vertical section of the leveler with the deck plate shown in the horizontal cross traffic position.

As best illustrated in FIG. 2, an upper movable pressure plate or member 22 is pivoted to the forward edge of the horizontal plate or fixed pressure member 8. To provide this pivotal connection, the plate 8 and plate 22 are provided with aligned hinge pins 23 and 24 which are interconnected by hinge pin 25. This connection enables the pressure member 22 to pivot upwardly relative to the lower fixed pressure member 8. Located between pressure members 8 and 22 is a flexible bag 26, preferably formed of plastic material. In practice, the bag may be formed of nylon fabric impregnated with a thermosetting resin, such as polyethylene.

To inflate the bag, a fan or blower 27 is mounted on the lower end of plate 6, and the outlet of the fan 27 is connected via a conduit 28 to a fitting 29 in bag 26. Fan 27 is adapted to supply low pressure air, generally in the range of 0.5 to 5.0 psig to the bag to thereby inflate the bag.

Figure 3:
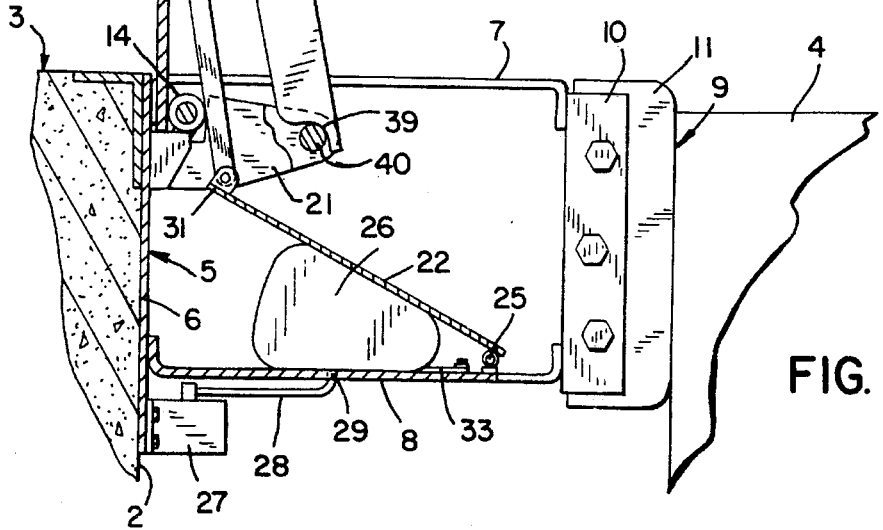
FIG. 3 is a view similar to FIG. 2 showing the deck plate and lip in an upper elevated position.

Connecting the upper pressure member 22 with the deck plate 12 is a pair of links 30. As shown in FIG. 2 and 3, the low end of each link 30 is pivotally connected to a pair of lugs 31 on plate 22, while the opposite end of each link is pivoted to lug 32 on the underside of deck plate 12. The links 30 increase the magnitude of pivotal movement of deck plate 12, thus enabling a smaller volume bag 26 to be used.

To prevent bag 26 from squeezing rearwardly as it is inflated, the bag is secured or tethered to plate 8. In this regard, a tether strip 33 is attached to bag 26, and extends forwardly away from dock 3. Tether strip 33 preferably extends the full width of bag 26 and is attached to plate 8 through a retaining strip 34 and a series of spaced bolts 35. The tether 33 will prevent bag 26 from squeezing rearwardly as the bag is inflated to pivot deck plate 12 to the vertical position.

FIG. 2 shows the dock leveler in the storage position, in which the deck plate 12 is supported on supports or stops 21. In the storage position, deck plate 12 is generally horizontal and lip 13 is pendant as illustrated in FIG. 2.

To move the dock leveler to the operative position, fan 27 is operated to thereby supply air through line 28 to bag 26 to inflate the bag. Inflation of bag 26 pivots the upper pressure plate 22 upwardly and thus pivots the deck plate 12 upwardly, as illustrated in FIG. 3. In this position, the deck plate 12 is in a substantially vertical position, and is held in this position by a locking bar 37. As best shown in FIG. 3, the upper end of the lock bar is pivotally connected to a pair of lugs 38 on the underside of lip 13. When the deck plate is pivoted upwardly through inflation of bag 26, the rear edge of lugs 38 will engage the deck plate to hold the lip 13 outwardly at an acute angle relative to the deck plate, and a notch 39 on the lower end of locking bar 37 will engage a horizontal rod 40, which is supported through lugs 21 that project outwardly from plate 6 of frame 5. In the position shown in FIG. 3, the locking bar 37 is in an over-center position at a slight angle to the vertical.

Operation of fan 27 is then discontinued and the deck plate 12 and lip 13 will then pivot downwardly by gravity. As the deck plate 12 pivots downwardly, locking bar 37 will initially pivot to a centered or vertical position and then to an undercenter position, causing the pivot between the locking bar and the lugs 38 to move in an upward curved path. Due to the position of the pivots, the outer tip of lip 13 will initially describes an upwardly curved path of travel which enables the lip to clear the bed of the truck 4, even though the truck bed may be located above dock level. Subsequent downward pivotal movement of the deck plate will cause the lip to engage the bed of the truck. The construction of locking bar 37, along with the movement of the lip 13, in engaging the truck bed is similar to that described in U. S. Pat. No. 3,685,077.

After the loading or unloading operation has been completed, the truck merely pulls away from the dock, causing lip 13 to pivot downwardly to the pendant position, and the deck plate will pivot downwardly until it engages the stops 21 to limit its descent and maintain the deck plate in the generally horizontal storage position.

Through use of the inflatable bag 26, the deck plate 12 and lip 13 are pivoted upwardly without manual effort. The system thus has all the advantages of a hydraulically operated system, but with substantially reduced cost.

As no counterbalancing system is utilized, the entire weight of the deck plate will rest on the truck bed and there is no tendency for the dock leveler to jack-knife as material handling equipment, such as a fork lift truck, passes over the dock leveler in travel between the loading dock and the truck bed.

On termination of operation of fan 27, the deck plate 12 will pivot downwardly causing the air in bag 26 to be exhausted through the fan. This restricted exhaust of the air will provide a slow and controlled descent of the deck plate to the operative position.

FIGS. 6 and 7 illustrate a modified form of the invention in which the upper pressure plate 22a is hinged to the rear edge of lower pressure plate 8, rather than being hinged to the front edge as in the embodiment of FIGS. 1–5. A pair of links 30a, corresponding to links 30 of the first embodiment, pivotally connect the forward edge of upper pressure plate 30a with the underside of deck plate 12. In the construction of FIGS. 6 and 7, inflation of bag 26 through operation of fan 27 will pivot the deck plate 12 upwardly to a generally vertical position, as illustrated in FIG. 7. Except for the reversal of the pivotal connection between the pressure members, the construction of FIGS. 6 and 7 is the same as that of FIGS. 1–5.

I claim:

1. A dock leveler for mounting on a loading dock, comprising:

a supporting structure attachable to the loading dock;

a deck plate having a rear end pivotally connected to said supporting structure;

an inflatable bag operatively positioned to pivot said deck plate upon inflation and deflation of said bag;

inflating means for introducing a gas under pressure into said bag to selectively inflate and deflate said bag, thereby resulting in pivotal movement of said deck plate; and means for preventing displacement of said inflatable bag, wherein said means for preventing displacement comprises a tether interconnecting said bag with said supporting structure.

2. The dock leveler of claim 1, further comprising:

a first pressure member interconnected with said supporting structure; and a second pressure member mounted for movement relative to said first pressure member and operatively connected to said deck plate, wherein said inflatable bag is disposed between said first and second pressure members.

3. The dock leveler of claim 2, further comprising a linkage interconnecting said second pressure member and said deck plate.

4. The dock leveler of claim 2, wherein said tether interconnects said bag and said first pressure member.

5. The dock leveler of claim 3, wherein said linkage includes a rigid link having one end pivotally connected to said second pressure member and the opposite end connected to said deck plate.

6. A method of making a dock leveler, comprising the steps of:

pivotally connecting a rear end of a deck plate to a supporting structure;

attaching a bag support to the supporting structure;

positioning an inflatable bag on the supporting structure such that the deck plate is pivoted upon inflation and deflation of the bag; and securing one portion of a tether to the inflatable bag and another portion of the tether to the bag support.

7. A dock leveler, comprising:

a supporting structure;

a deck plate having a rear end pivotally connected to said supporting structure;

a movable pressure member positioned under said deck plate;

a linkage member interconnecting said pressure member with said deckplate, said linkage member being pivotally connected with said deck plate at a first pivot location and pivotally connected with said movable pressure member at a second pivot location different than the first pivot location; and an inflatable bag operatively positioned to move said pressure member, thereby causing pivotal movement of said deck plate.

8. The dock leveler of claim 7, wherein said dock leveler further includes a tether extending from said inflatable bag toward said pivot location.

* * * * *